United States Patent [19]

Witte

[11] Patent Number: 5,574,858
[45] Date of Patent: Nov. 12, 1996

[54] METHOD AND APPARATUS FOR, UPON RECEIPT OF DATA FROM A MOUSE, REQUIRING THE REMAINDER OF DATA NEEDED TO CONSTITUTE A PACKET TO BE RECEIVED WITHIN ONE SECOND

[75] Inventor: Kendall C. Witte, Austin, Tex.

[73] Assignee: Dell U.S.A., L.P., Austin, Tex.

[21] Appl. No.: 514,508

[22] Filed: Aug. 11, 1995

[51] Int. Cl.$^6$ ............................................. G06F 11/00
[52] U.S. Cl. .............................. 395/185.09; 395/185.08; 395/850; 395/878; 371/62
[58] Field of Search .......................... 371/30–33, 61–62; 341/20; 395/849–850, 878, 893, 182.03, 182.13–182.16, 185.01–185.03, 185.04, 185.08–185.09

[56] References Cited

U.S. PATENT DOCUMENTS

| | | | |
|---|---|---|---|
| 4,872,110 | 10/1989 | Smith et al. | 395/185.08 |
| 5,056,088 | 10/1991 | Price et al. | 370/94.1 |
| 5,303,302 | 4/1994 | Burrows | 380/49 |
| 5,412,803 | 5/1995 | Bartow et al. | 395/200.01 |
| 5,467,467 | 11/1995 | Ozawa | 395/185.08 |
| 5,469,432 | 11/1995 | Gat | 370/60 |

*Primary Examiner*—Lance L. Barry
*Attorney, Agent, or Firm*—Haynes and Boone, L.L.P.

[57] ABSTRACT

A method of operating a computer which has a CPU, an input/output coprocessor, and an attached pointing device, the input/output coprocessor receiving data in packets from the attached pointing device. When the coprocessor receives data from the pointing device, if the pointing device produced the data in response to a command from the CPU, the coprocessor passes the data unmodified to the CPU. When the coprocessor receives data from the pointing device, if the pointing device did not produce the data in response to a command from the CPU, the coprocessor requires the remainder of the data packet to appear within one second before passing the packet of data to the CPU.

11 Claims, 2 Drawing Sheets

METHOD AND APPARATUS FOR, UPON RECEIPT OF DATA FROM A MOUSE, REQUIRING THE REMAINDER OF DATA NEEDED TO CONSTITUTE A PACKET TO BE RECEIVED WITHIN ONE SECOND

TECHNICAL FIELD

This invention relates to personal computers, and in particular to a personal computer which uses a pointing device with the PS/2 mouse protocol.

BACKGROUND OF THE INVENTION

Pointing devices using the PS/2 mouse protocol send undelimited packets of data. The PS/2-mouse protocol provides no recovery mechanism at the operating system or application level. When portions of these packets are lost due to system activity, overrun, or connection/disconnection, then the pointing device become very erratic and the user is unable to continue using the computer. This is a problem with some pointing devices because they occasionally fail. For example, they may deliver a partial packet in response to RESET, or may fail to deliver a complete packet when held off too long. Furthermore, if hot-plug is allowed, the pointing device may be in the middle of a data packet when it is removed.

SUMMARY OF THE INVENTION

The method of the present invention addresses the above problem by having the input/output coprocessor verify that all data received from the mouse conforms to the PS/2-mouse protocol before sending the data to the application or operating system. By buffering each packet and verifying that it is complete, this method prevents packet disruption from getting to the application.

A computer has a CPU, an input/output coprocessor, and an attached pointing device. The input/output coprocessor receives data in packets from the attached pointing device. When the coprocessor receives data from the pointing device, if the pointing device produced the data in response to a command from the CPU, the coprocessor passes the data unmodified to the CPU. When the coprocessor receives data from the pointing device, if the pointing device did not produce the data in response to a command from the CPU, the coprocessor requires the remainder of the data packet to appear within one second before passing the packet of data to the CPU.

In another feature of the invention, the coprocessor first checks to see if the pointing device is a PS/2 mouse, and proceeds with the error-checking steps only if the pointing device is a PS/2 mouse.

In another feature of the invention, the pointing device is an embedded trackball.

BRIEF DESCRIPTION OF THE DRAWINGS

The above-noted and other aspects of the present invention will become more apparent from a description of the preferred embodiment when read in conjunction with the accompanying drawings. The drawings illustrate the preferred embodiment of the invention. In the drawings the same members have the same reference numerals.

DETAILED DESCRIPTION OF THE PREFERRED EMBODIMENT

Figure 1:
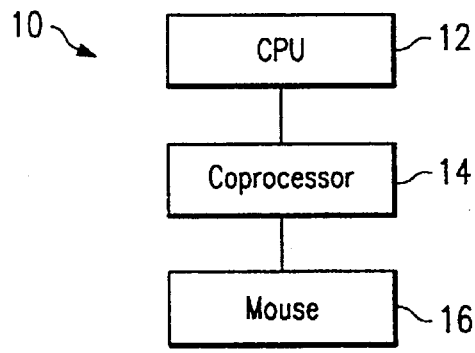
FIG. 1 is a schematic plan view of a computer employing a coprocessor and a mouse according to the present invention.

FIG. 1 is a schematic plan view of a computer 10 which includes a central processing unit, or CPU 12. The CPU 12 is conductively coupled to an input/output coprocessor 14, which in the preferred embodiment is an Intel Model No. 8051 processor. The coprocessor 14 handles the input and output processing for the computer 10. The coprocessor 14 is conductively coupled to a mouse 16, and sends commands to the mouse 16, and receives data from the mouse.

Figure 2B:
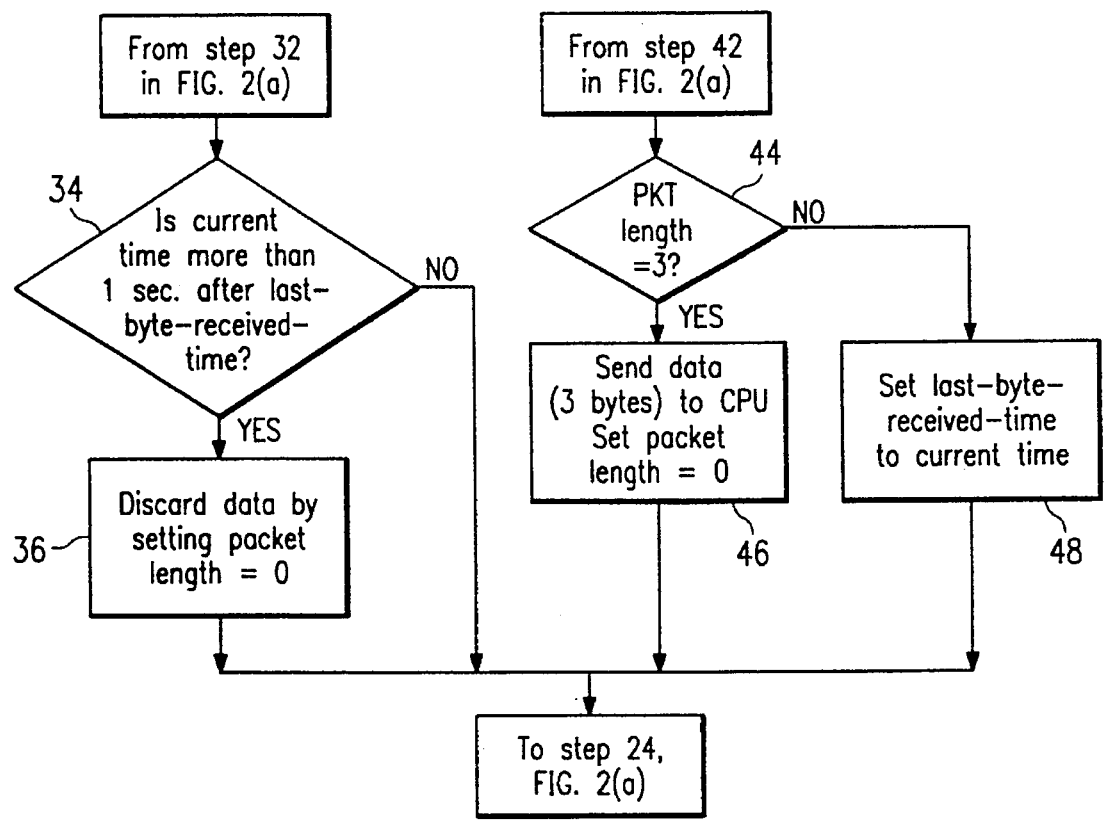
FIGS. 2(a) and 2(b) constitute a single flow chart depicting the method of the present invention.
Figure 2A:
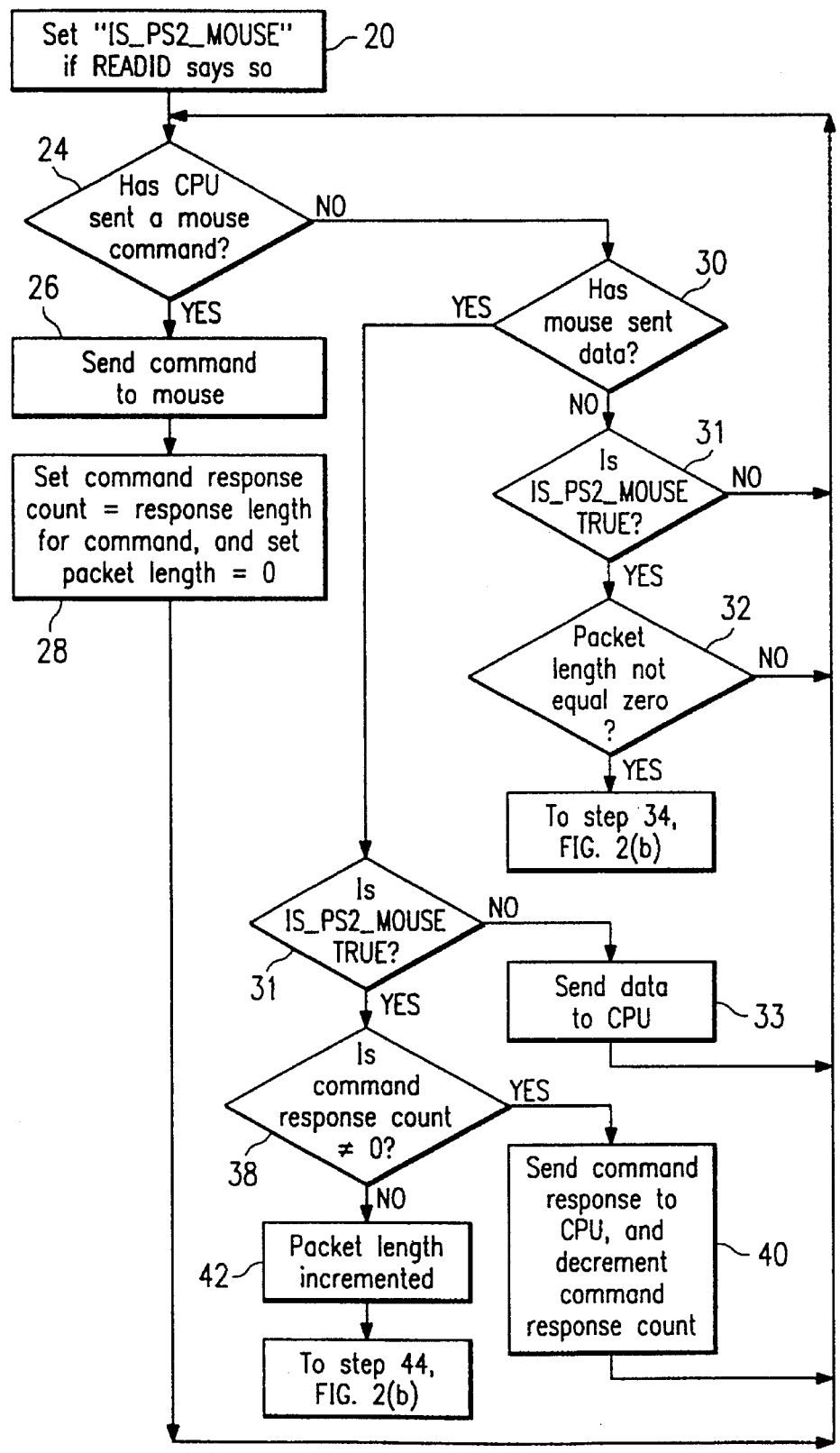

Referring now to FIGS. 2(a) and 2(b), a flow chart shows the method of the present invention. In step 20 the coprocessor 14 uses the READID command to determine that a PS/2-mouse pointing device is present. If so, then the variable "IS-PS2-MOUSE" is set to TRUE. The error correction is done only if the device identifies itself as a PS/2-mouse.

In step 24 the coprocessor 14 checks to see if the CPU 12 has sent a mouse command to the coprocessor 14. If it has sent a command, then in step 26 the coprocessor 14 sends the command to the mouse 16. In step 28 the coprocessor 14 sets the command response count equal to the response length for the command, and sets the packet length equal to zero, and returns to step 24 to service the next event.

Referring back to step 24, if the CPU has not sent a mouse command, then in step 30 the coprocessor 14 checks to see if the mouse 16 has sent data. If it has not sent data, then in step 31 the coprocessor 14 checks to see if the variable "IS_PS2_MOUSE" is TRUE. If the variable "IS_PS2_MOUSE" is not TRUE, then the coprocessor 14 returns to step 24 to wait for the next mouse signal. If it is TRUE, then in step 32 the coprocessor 14 checks to see if the packet length is not equal to zero. If the answer is no, that is, the packet length equals zero, then the coprocessor 14 returns to step 24.

If the packet length does not equal zero, then in step 34 (shown in FIG. 2(b)) the coprocessor 14 tests to see if the current time is more than one second after the time recorded by the variable "LAST_BYTE_RECEIVED_TIME". If it is later, then in step 36 the coprocessor 14 discards the data from the mouse by setting the packet length equal to zero, and returns to step 24. If the answer is "NO", then the coprocessor 14 returns to step 24.

Referring back to step 30, if the mouse 16 has sent data, then in step 31 the coprocessor 14 checks to see if the variable "IS_PS2_MOUSE" is TRUE. If the variable "IS_PS2_MOUSE" is not TRUE, then the coprocessor 14 in step 33 sends the data to the CPU, and returns to step 24. If it is TRUE, then in step 38 the coprocessor 14 checks to see if the command response count is not equal to zero.

If the command response count is not equal to zero, then in step 40 the coprocessor 14 sends the command response to the CPU 12, decrements the command response count by one, and returns to step 24. Referring back to step 38, if the command response count equals zero, then in step 42 the coprocessor 14 increments the packet length by one byte, and in step 44 (shown in FIG. 2(b)) checks to see if the packet length equals three.

If the packet length equals three, then in step 46 the coprocessor 14 sends the data (three bytes) to the CPU, sets the packet length equal to zero, and returns to step 24. If in step 44 the packet length is not equal to three, then in step 48 the coprocessor 14 sets the variable "LAST_BYTE_RECEIVED_TIME" to the current time, and returns to step 24.

Although an illustrative embodiment of the invention has been shown and described, other modifications, changes, and substitutions are intended in the foregoing disclosure. For example, the mouse could be a trackball, a touchpad, or a joystick.

In an alternate embodiment, whenever a data byte is received, the coprocessor can dedicate itself to reading the remainder of the data packet immediately. No data would be sent to the CPU from the coprocessor unless an entire packet has been read. This is essentially what is described above for the preferred embodiment of the method of the present invention, with the addition that all other devices are disabled while waiting for the packet to complete.

In another alternate embodiment, data bytes are passed to the CPU as they are received. The coprocessor verifies that the unsolicited data formed a valid packet (i.e., consists of three bytes); if not, "NOP" data is inserted. This handles the case where the external mouse has been removed in the middle of a packet.

Accordingly, it is appropriate that the appended claims be construed broadly and consistently with the scope of the invention.

What is claimed is:

1. A method of operating a computer which has a CPU, an input/output coprocessor, and an attached pointing device, the input/output coprocessor receiving data in packets from the attached pointing device, the method comprising the steps of:

when the coprocessor receives data from the pointing device, if the pointing device produced the data in response to a command from the CPU, passing the data unmodified to the CPU; and when the coprocessor receives data from the pointing device, if the pointing device did not produce the data in response to a command from the CPU, requiring the remainder of the data packet to appear within one second before passing the packet of data to the CPU.

2. The method of claim 1, further comprising the step of discarding data if the pointing device does not deliver a complete packet within one second.

3. The method of claim 1, wherein the packet length is three bytes.

4. The method of claim 1, further comprising the step of first checking to see if the pointing device uses a PS/2 mouse protocol, and proceeding with the steps of claim 1 only if the pointing device uses a PS/2 mouse protocol.

5. The method of either one of claims 1–4, wherein the pointing device is an embedded trackball.

6. The method of either one of claims 1–4, wherein the pointing device is an external mouse.

7. The method of either one of claims 1–4, wherein the pointing device is a touchpad.

8. A computer comprising:

a CPU requesting actions from an attached pointing device; and a coprocessor coupled to and responsive to the CPU and to the attached pointing device, receiving data in packets from the attached pointing device, passing the data unmodified to the CPU if the pointing device produced the data in response to a command from the CPU; and if the pointing device did not produce the data in response to a command from the CPU, requiring the remainder of the data packet to appear within one second before passing the packet of data to the CPU.

9. The computer of claim 8, wherein the pointing device is an embedded trackball.

10. The computer of claim 8, wherein the pointing device is an external mouse.

11. The computer of claim 8, wherein the pointing device is a touchpad.

* * * * *